United States Patent
Hughes

[15] 3,670,362
[45] June 20, 1972

[54] STUFFING APPARATUS FOR SAUSAGE BATTER AND THE LIKE

[72] Inventor: Alvin W. Hughes, 4N 194 Church Road, Bensenville, Ill. 60106

[22] Filed: Nov. 18, 1970

[21] Appl. No.: 90,495

[52] U.S. Cl. ..................................... 17/39, 107/14, 107/27
[51] Int. Cl. .......................................................... A22c 11/06
[58] Field of Search ................... 17/35, 39, 41, 40; 107/14 B, 107/54, 27 R

[56] References Cited

UNITED STATES PATENTS 1,881,106 10/1932 Vogt et al. ............................ 17/35 UX
2,341,609 2/1944 Gotzinger ................................. 17/39
3,547,052 12/1970 Artiaga ................................ 107/27 R

*Primary Examiner*—Lucie H. Laudenslager
*Attorney*—Wolfe, Hubbard, Leydig, Voit & Osann, Ltd.

[57] ABSTRACT

Improved apparatus for continuously stuffing sausage batter, or a like substance, at a uniform rate of discharge into casings. In the illustrative embodiment, a single cylinder and piston arrangement maintains a constant pressure upon the sausage batter within the cylinder by means of controlled fluid pressure upon the piston with the sausage batter entering the cylinder continuously through an aperture in the piston and at a pressure approximately equal to that acting upon the piston.

5 Claims, 1 Drawing Figure

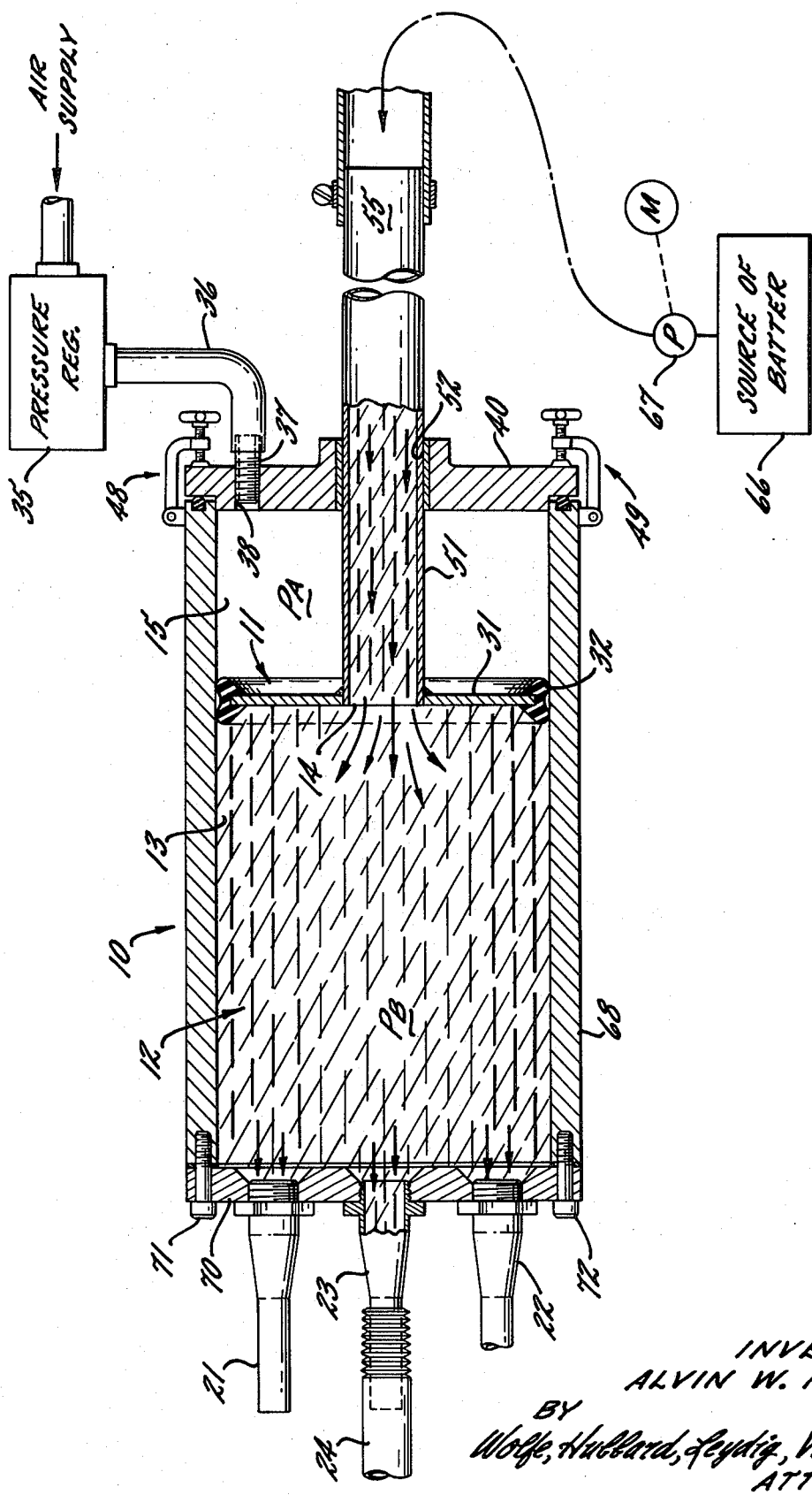

3,670,362

STUFFING APPARATUS FOR SAUSAGE BATTER AND THE LIKE

BACKGROUND AND OBJECTS

The present invention relates generally to stuffing machines for sausage batter and the like and more particularly to an improved stuffing apparatus for filling sausage casings at a continuous and uniform rate.

It is a primary object of the present invention to provide a novel stuffing apparatus which is capable of filling sausage casings in a continuous manner at a uniform rate.

Another object of this invention is to provide a continuous stuffer apparatus which is simple in construction yet easily cleaned at the end of its operational period. In this connection it is a related object to provide a relatively low cost, highly reliable stuffing apparatus where any maintenance that may be required can be handled even by a relatively unskilled worker.

Other objects and advantages of the invention will become apparent by reference to the following detailed description and the accompanying drawing.

BRIEF DESCRIPTION OF DRAWING

The drawing FIGURE shows a horizontal partly sectional and partly schematic section view of an exemplary embodiment of a stuffing apparatus incorporating the features of the present invention.

While the invention will be described in connection with a certain preferred embodiment, it will be understood that it is not intended to limit the invention to the particular illustrative embodiment. On the contrary, it is intended to cover all alternatives, modifications and equivalent arrangements as may be included within the spirit and scope of the invention.

DETAILED DESCRIPTION

Turning now to the drawing, there is illustrated one embodiment of the invention wherein the stuffing apparatus includes an enclosed chamber, indicated generally at 10, provided with a piston 11 that acts to compress sausage batter 12 disposed on the discharge side of the piston within chamber 10. The sausage batter enters the chamber discharge side 13 under pressure by passing through an opening 14 provided in the piston 11. As the sausage batter is compressed by the piston 11, it is pressed through sausage stuffing horns, 21, 22 and/or 23 or the like into sausage casings 24. It is understood by those skilled in the sausage making art, that in order to fill casings at a continuous and uniform rate it is necessary for uniform pressure to be exerted upon the sausage batter located within the discharge side of the chamber to achieve the desired result of uniformly forcing the batter out through the horns.

The piston 11 is in the form of a non-flexible annular plate 31 surrounded by a resilient annular seal ring 32. The seal ring 32 acts to provide an air-tight seal against the inner wall of chamber 10.

For the purpose of applying a compressive force to the piston 11 there is provided a fluid under a pressure within the inlet side portion 15 of chamber 10. The fluid under pressure is provided from a suitable source such as air and the chamber portion 15 is maintained at a substantially constant pressure value $P_A$ by a relieving pressure regulator 35, that precludes build up of a pressure beyond a predetermined maximum pressure. The pressure regulator is connected to the fluid pressure side 15 of the chamber by means of tubing 36 which terminates in a threaded end portion 37 mounted in a corresponding threaded opening 38 in the chamber end wall 40. As long as the pressure within the chamber 15 is maintained constant at pressure $P_A$, filling of the casings 24 occurs at a constant rate.

In carrying out the present invention, filling of the discharge side 13 of chamber 10 can take place at the same time that the casings are being stuffed. In this manner the filling of the casings occurs continuously.

To accomplish this aspect of the invention, opening 14 within the piston 11 allows entry of the sausage batter 12 into the chamber compression side 13 of the piston. Through the opening 14 there is provided a tube 51 rigidly mounted to the piston and extending through an opening 52 in the rear wall 40 of the pressurized side 15 of chamber 10. The opening 52 is so constructed as to provide an air-tight seal around the tube 51, but allows slidable movement of the tube 51 with respect to the opening as the piston 11 moves back and forth, within the chamber.

In order to provide a continuous supply of batter to the discharge side 13 of the chamber, the rear portion 55 of the tube 51 is connected to a suitable source of pressurized batter 66. The batter is forced through the tube 51 and into the discharge chamber by suitable means such as a constant pressure pump P driven by motor M. The pressure $P_B$ which is applied to the batter by the pump 67 is nearly equal to, but slightly greater than, the pressure $P_A$ within the fluid pressure portion 15 of chamber 10. As long as the pressure $P_B$ remains slightly greater than pressure $P_A$, the piston will remain in its rearmost position (to the right as viewed in the drawing) in the chamber and filling of the casings will be accomplished as a result of the batter pressure $P_B$. If for any reason the batter pressure $P_B$ should fall below that of chamber portion 15 pressure $P_A$, the piston will move forward insuring that the pressure on the batter within the discharge side of the cylinder is approximately equal to pressure $P_A$. When the batter pressure $P_B$ is restored to a value greater than $P_A$, piston 14 will move slowly back to the rearmost position of the cylinder 10, and the filling of the casings 24 will continue under the force of the batter pressure $P_B$.

As pressures $P_A$ and $P_B$ are nearly equal, the filling of the casings 24 is accomplished continuously at a uniform rate, the piston acting to supply pressure to the batter only when the batter supply pressure $P_B$ is below $P_A$.

While those skilled in the art will appreciate that the present invention is not limited to particular pressures $P_A$ and $P_B$, it is preferred, by way of example, that the batter pressure $P_B$ is approximately 80 psi and the fluid pressure $P_A$ is approximately within the range of about 70 to 80 psi.

In accordance with another important aspect of the invention, the stuffing apparatus may be quickly and easily disassembled for cleaning and replacing seals and worn parts. To this end the chamber 10 is in the form of a cylinder 68 to which is secured a front closure plate 70 by means of bolts 71 and 72. The rear closure plate 40 is secured to the cylinder 68 by means of quick disconnect assemblies for cleaning and maintenance by releasing the quick disconnect assemblies 48 and 49 to remove the rear closure plate and piston.

While the horns 21, 22, 23 are shown as being three in number each threadably mounted to the plate 70, it will be apparent that this may be varied depending upon the volume of product production desired. One or more of the horns, for example, may be removed and replaced by a suitable plug to lessen the number of casings stuffed at one time.

From the above description one may see that by the unique but simple construction of the invention, the filling of sausage casings may be accomplished at a uniform rate in a continuous manner yet the stuffer of the present invention is capable of being quickly, easily and thoroughly cleaned after use.

I claim as my invention:

1. Apparatus for stuffing sausage batter and the like adapted to be connected to a source of batter under a first pressure, comprising in combination, an enclosed chamber having inlet means and outlet means disposed at the opposite ends of said chamber, a piston slidably disposed within said chamber between said inlet means and said outlet means, means defining an opening in said piston; conduit means connecting said piston opening means to said inlet means of said chamber, means connecting said source of batter to said inlet means, a source of fluid pressure, means connecting said fluid pressure source with the chamber for exerting a second pressure on the inlet means side of said piston, and means for limiting said second pressure acting upon said inlet means side of the piston so that said batter first pressure is normally slightly greater than said second pressure acting upon said inlet side of said piston.

2. Stuffing apparatus as claimed in claim 1 wherein said conduit means connecting said piston opening means to said inlet means is slidably mounted with respect to said chamber inlet means and rigidly connected to said piston.

3. Stuffing apparatus as claimed in claim 1 wherein said second fluid pressure acting upon the inlet side of said piston is within the range of about 70 to 80 psi, and said first batter pressure is approximately 80 psi.

4. Stuffing apparatus as claimed in claim 1 wherein said outlet means comprises a plurality of sausage stuffing horns.

5. Stuffing apparatus as claimed in claim 1 wherein said enclosed chamber includes a cylindrical shaped body, a closure plate carrying said outlet means connected to the outlet end of said body, an end member carrying said inlet means for closing the inlet end of said body and quick disconnect means associated with said body and said end member.

* * * * *